(12) United States Patent
Li et al.

(10) Patent No.: US 8,437,643 B2
(45) Date of Patent: May 7, 2013

(54) COMPENSATION OF TRANSMISSION IMPAIRMENTS IN POLARIZATION MULTIPLEXED SYSTEMS

(75) Inventors: Guifang Li, Oviedo, FL (US); Fatih Yaman, Oviedo, FL (US); Eduardo Mateo, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 404 days.

(21) Appl. No.: 12/727,542

(22) Filed: Mar. 19, 2010

(65) Prior Publication Data

US 2010/0239254 A1 Sep. 23, 2010

Related U.S. Application Data

(60) Provisional application No. 61/161,864, filed on Mar. 20, 2009.

(51) Int. Cl.
*H04B 10/12* (2006.01)
*H04B 10/06* (2006.01)
*H04J 14/06* (2006.01)

(52) U.S. Cl.
USPC ............... 398/159; 398/28; 398/65; 398/147; 398/209

(58) Field of Classification Search ............... 398/25, 398/28, 65, 147, 158, 159, 208, 211
See application file for complete search history.

(56) References Cited

U.S. PATENT DOCUMENTS

| | | | |
|---|---|---|---|
| 2003/0072051 A1* | 4/2003 | Myers et al. | 359/115 |
| 2009/0074427 A1* | 3/2009 | Liu | 398/205 |
| 2009/0074428 A1* | 3/2009 | Liu | 398/208 |
| 2009/0214215 A1* | 8/2009 | Li et al. | 398/81 |

OTHER PUBLICATIONS

Marcuse et al.; Application of the Manakov-PMD equation to studies of signal propagation in optical fibers with randomly varying birefringence, Lightwave Technology, Journal of, vol. 15, No. 9, pp. 1735-1746, Sep. 1997; doi: 10.1109/50.622902; URL: http://ieeexplore.ieee.org/stamp/stamp.jsp?tp=&arnumber=622902&isnumber=13558.*

* cited by examiner

*Primary Examiner* — Nathan Curs
(74) *Attorney, Agent, or Firm* — Thomas|Horstemeyer, LLP (57) ABSTRACT

Systems and methods of compensating for transmission impairment are disclosed. One such method includes receiving a polarization-division multiplexed optical signal which has been distorted in the physical domain by an optical transmission channel, and propagating the distorted polarization-division multiplexed optical signal backward in the electronic domain in a corresponding virtual optical transmission channel.

12 Claims, 7 Drawing Sheets

COMPENSATION OF TRANSMISSION IMPAIRMENTS IN POLARIZATION MULTIPLEXED SYSTEMS

CROSS-REFERENCE TO RELATED APPLICATIONS

This application claims priority to copending U.S. Provisional Application having Ser. No. 61/161,864 filed Mar. 20, 2009, which is hereby incorporated by reference herein in its entirety.

FIELD OF THE DISCLOSURE

The present disclosure relates to compensating for optical transmission impairments in the electronic or software domain.

BACKGROUND

Channel impairments in transmission systems result in signal degradation and thus limit the carrying capacity of these systems. In optical transmission systems, some of these impairments are linear (e.g., fiber chromatic dispersion or CD) and some are non-linear (e.g., cross-phase modulation and four-wave mixing caused by the Kerr effect). To minimize the effect of impairments, transmission systems may include various types of compensation systems or devices. A signal can be modified before, or as part of, transmission to account for the effect of impairment (a technique known as pre-compensation). Conversely, knowledge about an impairment can be used to modify a received signal to compensate for the impairment (a technique known as post-compensation). Such compensation systems or devices can be implemented in the optical domain or in the electrical/electronic domain, or in both domains at the same time.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The inventive techniques described herein compensate for optical distortion in a polarization-division multiplexed signal, using backward propagation in the electrical domain. Specifically, digital backward propagation is used to convert the received optical signal into an estimate of the transmitted signal. This digital backward propagation process involves solving one or more equations which model a virtual optical transmission channel corresponding to the physical optical transmission channel. The model uses channel parameter values that are opposite to ("backward" from) to the physical channel parameters. Applying the model to the received optical signal thus compensates for impairments produced by the physical channel.

Figure 1:
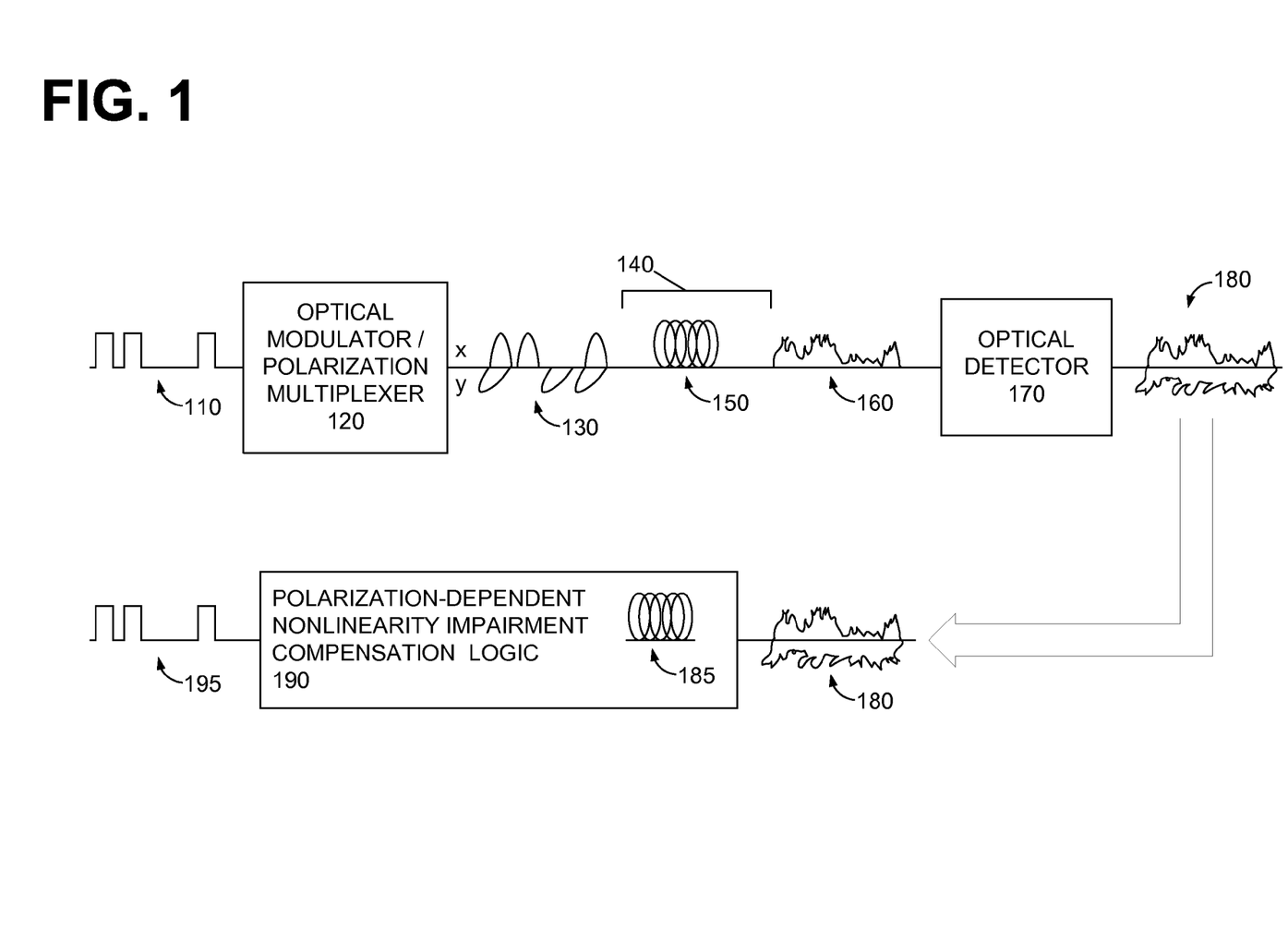
FIG. 1 is a system model diagram of an optical communication system including an embodiment of polarization-dependent nonlinearity impairment compensation logic.

FIG. 1 is a system model diagram of an optical communication system including an embodiment of polarization-dependent nonlinearity impairment compensation logic. Transmitted data is carried by an electrical signal 110, which is provided to an optical modulator and polarization multiplexer 120. Modulator/multiplexer 120 produces a (modulated) optical signal 130 which includes x and y polarization components, i.e., a polarization-division multiplexed signal. Although the system diagram of FIG. 1 does not depict multiple frequencies, it should be appreciated that the principles described herein can be extended to and/or combined with other forms of multiplexing such as wavelength-division multiplexing. These principles can also be extended to polarization interleaving rather than polarization multiplexing.

Polarization-multiplexed optical signal 130 travels through an optical channel 140, which includes optical fiber 150. Optical fiber 150 introduces various types of distortion, resulting in a distorted optical signal 160. Distorted optical signal 160 is provided to an optical detector 170, which converts the distorted optical signal to a signal in the electrical domain. Distorted electrical signal 180 is processed in the electrical (digital) domain by polarization-dependent nonlinearity impairment compensation logic 190. Logic 190 removes the distortion produced in the physical optical domain, by modeling the characteristics of optical fiber 150 in a virtual optical fiber 185. The output of polarization-dependent nonlinearity impairment compensation logic 190 is a compensated electrical signal 195. Carried within compensated electrical signal 195 is data which is a replica (or near replica) of the originally transmitted data.

The model embodied in polarization-dependent nonlinearity impairment compensation logic 190 accounts for, and reverses the effect of, various impairments introduced by optical fiber 150, including the polarization-dependent nature of non-linear effects. Some embodiments of logic 190 also compensate for linear impairments such as absorption, chromatic dispersion, polarization rotation, polarization-mode dispersion, and polarization-dependent loss. Some embodiments of logic 190 also compensate for some nonlinear impairments which may or may not be explicitly dependent on the state of polarization of the signal, such as self-phase modulation (SPM), cross-phase modulation (XPM), and four-wave mixing (FWM).

Figure 2:
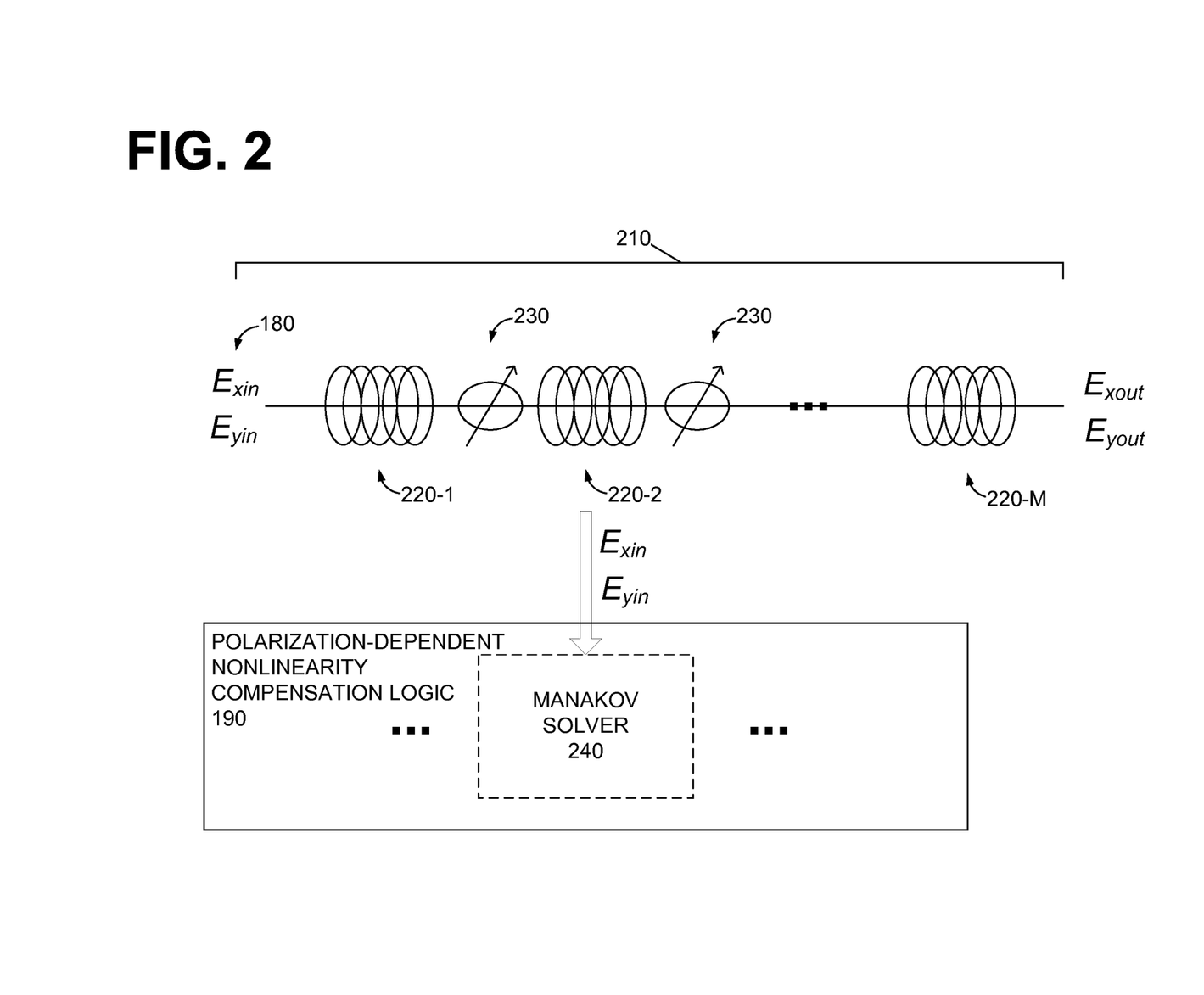
FIG. 2 is a system model diagram of a virtual fiber model implemented in the electrical domain, according to some embodiments.

FIG. 2 is a system model diagram of one embodiment of a virtual fiber model. $E_{in}$ is the electric field of the received distorted electrical signal (180 in FIG. 1). $E_{out}$ is the electric field of the compensated electrical signal (195 in FIG. 1). Virtual fiber link 210 includes multiple spans 220 (220-1, 220-2 ... 220-M), divided by attenuators 230, where attenuators 230 compensate for optical amplifiers deployed between fiber spans. In some embodiments, the number of attenuators and/or amount of attenuation is not the same as in the physical fiber being modeled.

Propagation of an optical field in a span 220 is governed by a z-reversed nonlinear Schrödinger equation (NLSE). In particular, since the signal 180 is polarization-multiplexed, the propagation is governed by a vectorial form of NLSE (VNLSE). The NLSE includes parameters which typically correspond to the characteristics of the physical optical fiber (150 in FIG. 1): absorption (loss) coefficient; first-order chromatic dispersion; second-order chromatic dispersion; and non-linear coefficient. The model compensates for physical fiber distortion by reversing the physical fiber parameters when solving the NLSE for each span, i.e., using parameter values that are the negative (opposite) of the actual fiber parameters. Since this is mathematically equivalent to reversing (negating) the sign of the spatial variable when solving the NLSE, the technique is known as "backward propagation".

Some embodiments of the virtual fiber model include higher order dispersion terms, such as the third-order chromatic dispersion, fourth-order chromatic dispersion, etc. Some embodiments utilize parameters which are not an exact match of the actual fiber parameters. Using such approximations can be useful in reducing computational load, when an exact measurement of the actual fiber parameters is not available, and/or when the actual fiber parameters change over time.

In a fiber that is free of birefringence, processes which produce nonlinear impairments depend on the state of polarization (SOP) of the optical fields. However, when birefringence is present, then the fields do not retain the same SOP for long enough to accumulate an appreciable amount of nonlinearity having the same polarization dependence. Therefore, with birefringence present, the nonlinearity experienced by the field is averaged so that the nonlinearity does not depend on the overall SOPs of the fields. Because of the random residual birefringence of the fibers, an equation called the Manakov equation (simpler than the VNLSE) can be used to describe the backward propagation of the optical fields after polarization multiplexing:

$$\frac{\partial E_x}{\partial (-z)} + \frac{\alpha}{2}E_x + i\frac{\beta_2}{2}\frac{\partial^2 E_x}{\partial t^2} - \frac{\beta_3}{6}\frac{\partial^3 E_x}{\partial t^3} - i\gamma\frac{8}{9}(|E_x|^2 + |E_y|^2)E_x = 0, \quad \text{(Eq. 1)}$$

$$\frac{\partial E_y}{\partial (-z)} + \frac{\alpha}{2}E_y + i\frac{\beta_2}{2}\frac{\partial^2 E_y}{\partial t^2} - \frac{\beta_3}{6}\frac{\partial^3 E_y}{\partial t^3} - i\gamma\frac{8}{9}(|E_x|^2 + |E_y|^2)E_x = 0,$$

where $E_x$ and $E_y$ are the amplitudes of the two polarization components of the total electrical field, $\alpha$ is the loss coefficient, $\beta_2$ and $\beta_3$ are the second- and third-order dispersion coefficients, and $\gamma$ is the nonlinear coefficient. The Manakov equation is invariant under polarization and is written here in the x- and y-polarization basis only for convenience.

As complex electrical signal 180 propagates along each span 220 and is distorted by fiber impairments 230, polarization-dependent nonlinearity impairment compensation logic 190 operates to compensate for these impairments. Specifically, Manakov solver module 240, which is part of polarization-dependent nonlinearity impairment compensation logic 190, takes the complex vector ($E_{xin}$, $E_{xout}$) as input and solves the Manakov equation for a particular span. Logic 190 can thus be viewed as a combination of modules 240 which together solve the equation for the entire optical fiber 150, and thus compensate for impairments along the entire optical fiber 150. It should be appreciated that this is a logical view. Thus, multiple physical instances of Manakov solver module 240 are not required, and the entire polarization-dependent nonlinearity impairment compensation logic 190 can be implemented (for example) by a single processor, digital logic block, etc.

The dispersive and nonlinear contributions to impairment are considered to be independent within a relatively short propagation length. The backward propagation process is therefore decomposed into a series of iterations or steps. The embodiments of Manakov solver module 240 described herein use the split-step Fourier method (SSFM) to solve the equation. The steps, which are specific to the equation, will be discussed in more detail later.

Figure 3:
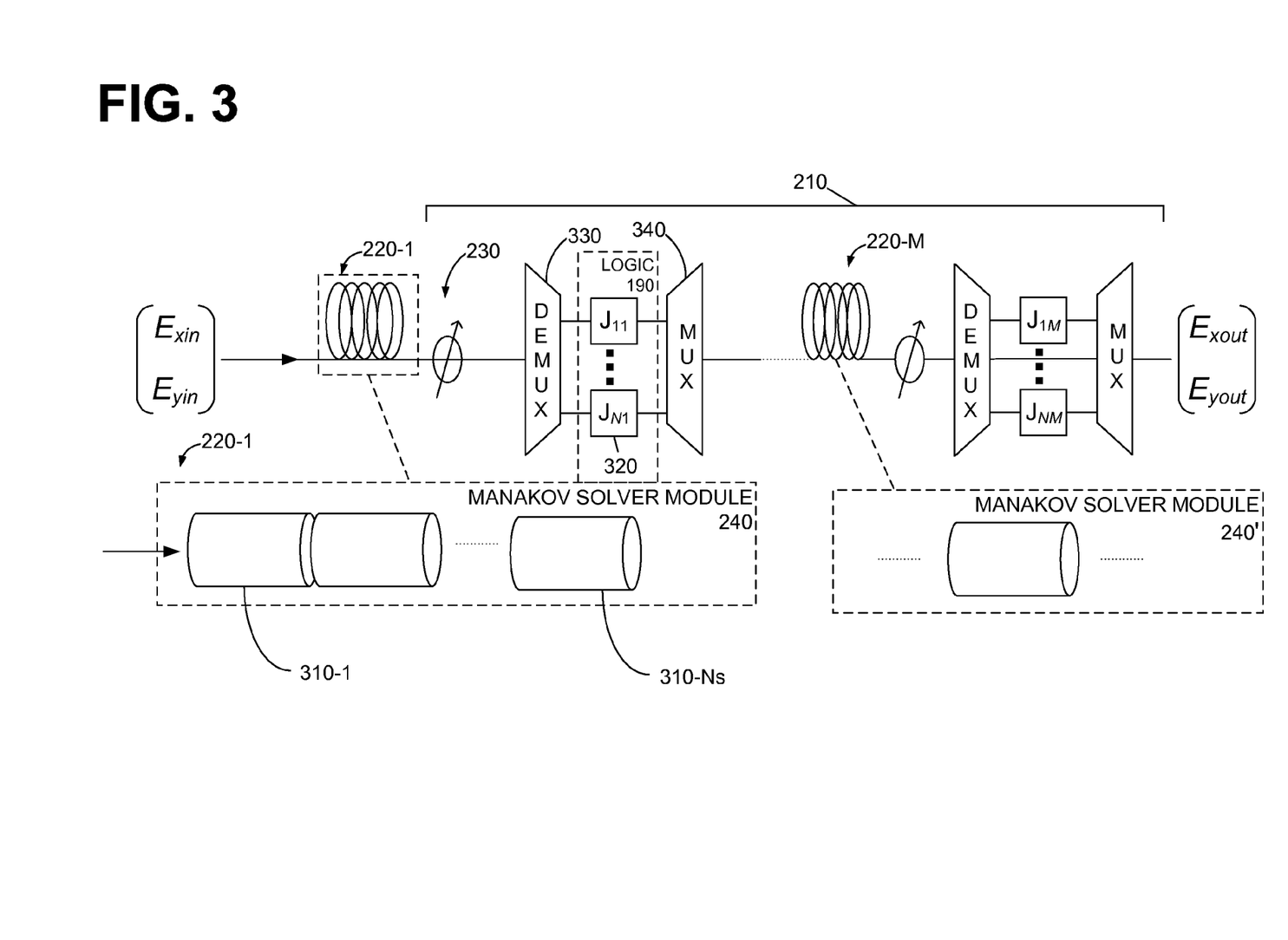
FIG. 3 is a block diagram of a virtual fiber model including an embodiment of a solver module from FIG. 2, according to some embodiments.

FIG. 3 is a block diagram of a virtual fiber model in which an embodiment of Manakov solver module 240 uses an SSFM in order to solve the Manakov equation. Virtual fiber link 210 includes M spans (220-1 . . . 220-M), separated in some cases by attenuator 230. Complex electrical signal 180 propagates along each span 220 and is distorted by fiber impairments 230. Some embodiments of virtual fiber link 210 also include virtual attenuators, in which case the virtual attenuator is modeled with an attenuation parameter that balances the gain of the corresponding optical amplifier in the physical fiber link.

In applying the SSFM, solver module 240 treats each span 220 as a series of iterations or steps 310-1 . . . 310-Ns. The steps are specific to the Manakov equation and will be discussed in more detail later. Because the nonlinear impairments depend on the state of polarization, polarization-dependent nonlinearity impairment compensation logic 190 tracks the polarization state by applying a Jones matrix 320 to the signal during back propagation for each span of virtual fiber link 210. Since FIG. 3 illustrates an embodiment in which wave-division multiplexing is used as well as polarization-division multiplexing, a frequency demultiplexer 330 is used to recover symbols carried by each frequency component. An instance of the Jones matrix 320 is used for each of those symbols, and then the symbols are recombined with a frequency multiplexer 340.

The Jones matrix 320 is applied as follows:

$$\begin{pmatrix} E_{xM}(\omega_1) \\ E_{yM}(\omega_1) \end{pmatrix} = J_{1M}\begin{pmatrix} E_{X(M-1)}(\omega_1) \\ E_{y(M-1)}(\omega_1) \end{pmatrix} \quad \text{(Eq. 2)}$$

$$\ldots$$

$$\begin{pmatrix} E_{xM}(\omega_N) \\ E_{yM}(\omega_N) \end{pmatrix} = J_{NM}\begin{pmatrix} E_{X(M-1)}(\omega_N) \\ E_{y(M-1)}(\omega_N) \end{pmatrix},$$

where $J_{ik}$ represents the Jones matrix of span k on channel i.

Figure 4:
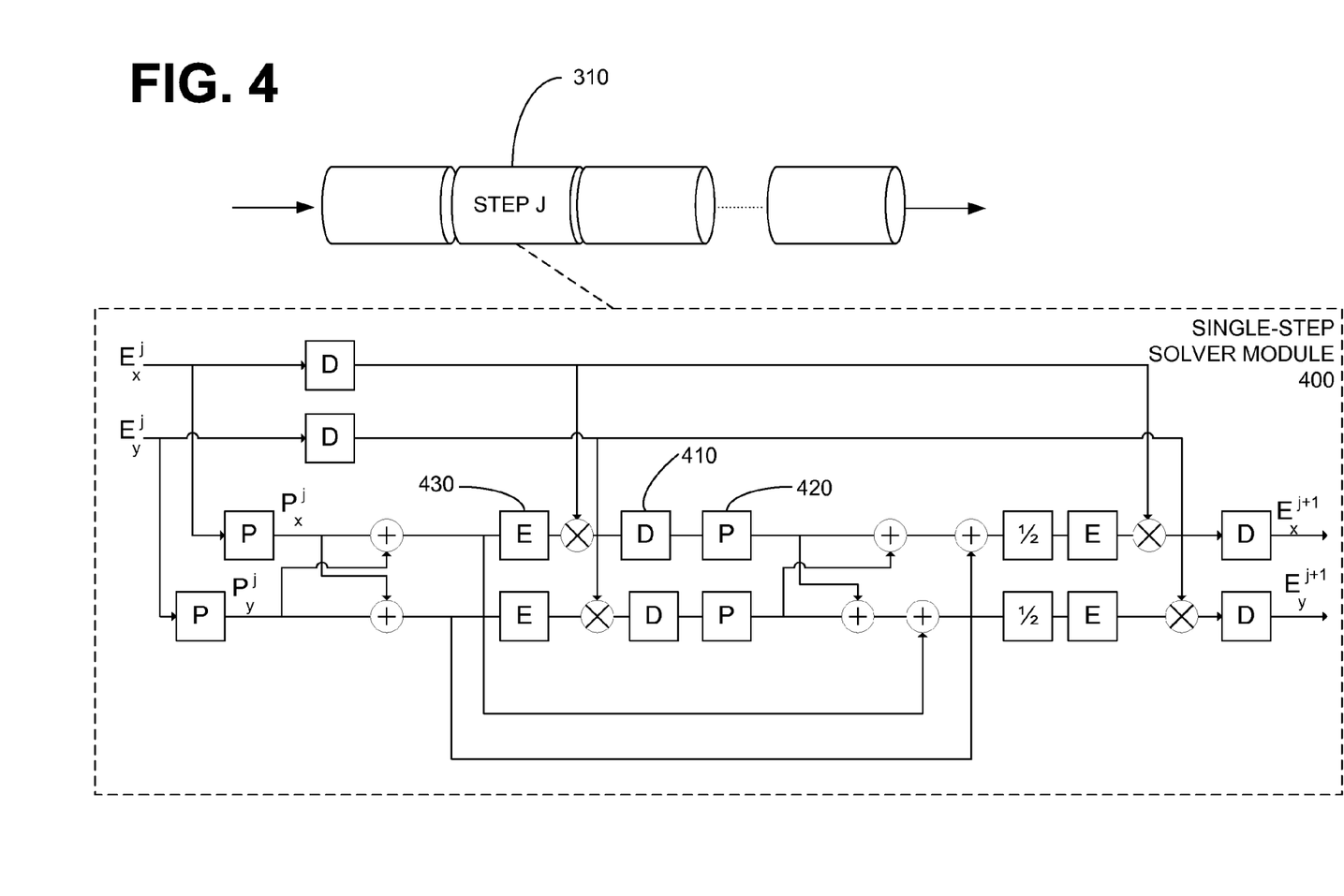
FIG. 4 is a block diagram of a single-step solver module which implements a single step from the split-step Fourier method, according to some embodiments.

FIG. 4 is a block diagram of a single-step solver module 400 as implemented by some embodiments of Manakov solver module 240 to perform compensation for a single segment or step (310). Single-step solver module 400 uses three different types of operators, combined as shown in FIG. 4: a dispersion operator 410; a power operator 420; and an exponential operator 430.

The dispersion, power, and exponential operators are given by $D(x)=FFT[H\phi(x)]$, $P(x)=|x|^2$, and $E(x)=\exp(i\gamma xh)$ where h is the step size. The transfer function H for fiber dispersion and absorption is given by $$H(\omega) = \exp\left[\left(\frac{\alpha}{2} + i\beta_2\frac{\omega^2}{2} + i\beta_3\frac{\omega^3}{6}\right)\frac{h}{2}\right]$$

with ω being the angular frequency. It should be appreciated that dispersion operator 410 can be implemented in various ways, in either the frequency domain or the time domain (e.g., finite impulse response (FIR) filter, infinite impulse response (IIR) filter).

Since the Manakov equation described above in Eq. 1 pertains to the whole field including all the WDM and polarization channels, Eq. 1 includes all the intra-channel as well as inter-channel nonlinear interactions. The Manakov equation described above in Eq. 1 is referred to hereinafter as the "full Manakov equation". An alternative embodiment of Manakov solver module (240') which solves another variation of the Manakov equation ("the coupled Manakov equations") will now be described.

Coupled Manakov solver embodiment 240' uses a full Manakov equation but modified to express the evolution of individual WDM channels coupled through the inter-channel nonlinear interactions (such as XPM and FWM) as follows:

$$\frac{\partial A_{i(p)}}{\partial z} = \qquad (Eq.\ 3)$$

$$-\frac{\alpha}{2}A_{i(p)} + i\sum_{n>0}\frac{i^n\beta_{in}}{n!}\frac{\partial^n}{\partial t^n} + i\gamma_m(|A_{i(p)}|^2 + |A_{i(|p-1|)}|^2)A_{i(p)} +$$

$$i\gamma_m\left(\sum_{j\neq i}2|A_{j(p)}|^2 + |A_{j(|p-1|)}|^2\right)A_{i(p)} +$$

$$i\gamma_m\left(\sum_{j\neq i}A^*_{j(|p-1|)}A_{i(|p-1|)}\right)A_{i(|p-1|)} +$$

$$i\gamma_m\sum_{q,s,t}\sum_{k\neq l}\sum_{l\neq i}\sum_{m\neq i}A^*_{k(q)}A_{l(s)}A_{m(t)}\delta(p+q-s-t)\times$$

$$\delta(\omega_l + \omega_k - \omega_l - \omega_m)\exp(i\Delta k_{i,k,m}z),$$

where $A_{i(p)}$ is the electric field amplitude for the ith WDM channel associated with the carrier frequency $\omega_i$ and the subscript in the parenthesis takes on values of 0 or 1 to denote the x or y polarization component, respectively. $\beta_{in}$ is the nth dispersion coefficient experienced by the ith channel. In other words, it is the nth coefficient of the Taylor expansion of the propagation constant $\beta(\omega)$ expanded around the carrier frequency of the channel $\omega_i$. Here in deriving Eq. 3 as used by coupled Manakov solver embodiment 240', it is assumed that the total electric field is composed of only the WDM channels as follows:

$$A_x = \sum_i A_{i(0)}\exp[-i\beta(\omega_i)z - i\omega_i t] \qquad Eq.\ 4$$

$$A_y = \sum_i A_{i(1)}\exp[-i\beta(\omega_i)z - i\omega_i t]$$

In writing the coupled equations (Eq. 3) it is possible to identify the individual terms responsible for different nonlinear processes. The third term on the right hand side of Eq. 3 is the self-phase modulation (SPM) term. Up to the third term, the equation used by coupled Manakov solver embodiment 240' is the same as the full Manakov equation described above (in connection with Manakov solver module 240) but written for a single channel. The rest of the nonlinear terms are responsible for the interchannel nonlinear effects.

The fourth term used by coupled Manakov solver embodiment 240' is the cross-phase modulation term which is similar in form to the XPM term that occurs in the scalar case, where all the channels have the same polarization. This fourth term induces nonlinear chirp proportional to the power of the neighboring channels, and it does not depend on their phases. Because of the absence of the explicit dependence on the phases of the neighboring channels this term is referred to herein as the incoherent XPM (IncXPM). The IncXPM is twice as strong for the channels with the same polarization compared to the orthogonal polarization.

The fifth term is also a cross-phase modulation term in the sense that it involves only two WDM channels. Unlike the IncXPM term, this term is not completely independent of the phases of the interacting fields. Phase changes originating from processes such as polarization mode dispersion, where the phase depends on both polarization and frequency, affects these terms directly. On the other hand, the phase that is common to both polarizations (such as group-velocity dispersion) or that is common to both channels (such as birefringence) cancels out. This term can also be viewed in terms of the four wave mixing (FWM) process between two WDM channels. As a result of this process, one photon from x polarization of the first channel and one photon from the y polarization of the second channel are transferred to y polarization component of the first channel and the x polarization of the second channel or vice versa. This fifth term is also partially responsible for the polarization dependence of cross-phase modulation.

The final term used by coupled Manakov solver embodiment 240' is the FWM term, which can cause transfer of power between different channels. In the notation of Eq. 3, the channels $A_i$, $A_k$, $A_l$ and $A_m$ are coupled through the FWM process as long as their frequencies satisfy the condition $\omega_i + \omega_k - \omega_l - \omega_m = 0$, and their polarization states are such that if $A_i$ and $A_k$ are parallel, $A_l$ and $A_m$ are also parallel to them, and if $A_i$ and $A_k$ are orthogonal to one another, $A_l$ and $A_m$ are also orthogonal to one another. As a result of FWM, an energy transfer occurs between the $A_i$, $A_k$ pair and $A_l$, $A_m$ pair. The magnitude and the direction of the energy transfer are determined by the phase relation between the four interacting channels. If the system is not working in the extremely high nonlinear regime, the FWM requires a certain length to accumulate enough energy transfer between the channels to cause a significant amount of distortion. If the phase relation between the channels is not maintained for long in the fiber, then distortions caused by FWM do not grow such that the phase relation can be neglected. The condition for maintaining the phase relation between the channels is called the phase matching condition. The phase matching condition is given by $\Delta k_{i,k,l,m} + \theta_{NL} = 0$, where $\Delta k_{i,k,l,m}$ represents the change in the phase relation between the channels per unit length as a result of fiber dispersion, and $\theta_{NL}$ represents the change in the phase relation between the channels per unit length as a result of accumulated nonlinear phase.

For a given WDM system with certain dispersion parameters, channel spacing, nonlinearity coefficient and power per channel it is possible to estimate whether FWM is negligible or not. In WDM systems with equal channel spacing, FWM is expected to be strongest between neighboring channels. In other words, if dispersion is strong enough to suppress FWM between neighboring channels it is strong enough to suppress FWM between channels that are farther apart. For FWM effects to grow considerably the phase relation between the interacting channels must be maintained for a length scale comparable to the nonlinear length given by $L_{NL} = 1/(\gamma_e P_{ch})$ where $\gamma_e = \gamma_m[1-\exp(-\alpha L_{sp})]/\alpha$ is the effective nonlinear parameter and $L_{sp}$ is the span length. Here nonlinear length is defined for power per channel to estimate FWM interactions between only the neighboring channels. The change in the phase relation between the interacting channels in a single nonlinear length should be small so that $\Delta k L_{NL} \ll TT$. For a given dispersion and channel spacing this condition becomes $\beta_2 \Delta\omega^2/(\gamma_e P_{ch}) \ll TT$. This condition can be used as a rule of thumb for the simplest cases as several assumptions have been made, for instance, the effect of polarization is ignored, and the possibility of efficient FWM coupling between farther channels through modulational instability is also ignored.

The coupled equations of Eq. 3 as used by coupled Manakov solver embodiment 240' omit some of the second order processes captured by the full Manakov equation discussed above (in connection with Manakov solver module 240). For instance, Eq. 3 does not account for energy transfer from WDM channels outside of the WDM bandwidth. To capture those effects extra channels beyond the WDM band are added to the coupled equations. Coupled equations also neglect the energy transfer through FWM to the parts of the spectrum that fall between the WDM channels.

XPM terms do not depend on the phases of the interacting channels; however, they are still sensitive to the state of polarizations (SOP)s of the channels. Since polarization dependence is a major source of nonlinear impairment, the nature of this polarization dependence should be understood. XPM can be divided into two parts, one part that is independent of the SOPs and one part that is completely polarization-dependent. To see this distinction explicitly the coupled equations used by coupled Manakov solver embodiment 240' are presented below in vector notation, and FWM terms are omitted:

$$\frac{\partial |A_i\rangle}{\partial z} = \qquad (\text{Eq. 5})$$
$$l(\omega_i)|A_i\rangle + i\gamma_m \langle A_i | A_i \rangle |A_i\rangle + i\gamma_m \sum_{j \neq i} (\langle A_j | A_j \rangle + |A_j\rangle + \langle A_j|)|A_i\rangle$$

where $|A_i\rangle = [A_{i(x)} A_{i(y)}]^T$ is the amplitude of the ith WDM channel in the vector notation, and $l(\omega_i)$ represents the linear terms in Eq. 3 including the loss and dispersion terms.

It can be seen by looking at Eq. 5, as used by some embodiments of alternative Manakov solver 240', that the SPM term and the first term of the XPM term do not have any polarization dependence. The second term in the XPM term is a matrix and it still has non zero trace, meaning that it has a component that has no polarization dependence. This term can be separated into the polarization dependent and independent parts by using the Pauli matrices as follows:

$|A_j\rangle\langle A_j| = [P_j + \vec{P}_j \cdot \vec{\sigma}]/2$, where $P_j = \langle A_j|A_j\rangle$ and $\vec{P}_j$ are the optical power and the Stokes vector of the jth channel, $\vec{\sigma} = [\sigma_1, \sigma_2, \sigma_3]$ is the Pauli spin vector, and $\sigma_1$, $\sigma_3$, and $\sigma_3$ are the Pauli spin matrices. Vector Eq. 5, as used by some embodiments of alternative Manakov solver 240', can now be separated into polarization independent and dependent parts as $$\frac{\partial |A_i\rangle}{\partial z} = \qquad (\text{Eq. 6})$$
$$l(\omega_i)|A_i\rangle + i\gamma_m P_i |A_i\rangle + \frac{3i\gamma_m}{2} \sum_{j \neq i} \vec{P}_j |A_i\rangle + \frac{i\gamma_m}{2} \sum_{j \neq i} \vec{P}_j \cdot \vec{\sigma} |A_i\rangle.$$

In Eq. 6 (used by some embodiments of alternative Manakov solver 240'), the first term in the second line is the portion of XPM that is not dependent on the SOPs of the interacting channels. This term induces phase shift that is proportional to the total powers of WDM channels in both polarizations. The last term, however, is completely dependent on the SOPs of the interacting channels. Similar to the polarization-independent portion, all channels also contribute to the polarization-dependent part. The polarization dependent part has two distinct contributions. First, just as the polarization independent part of XPM, it contributes to the nonlinear phase shift. Second, it causes nonlinear rotation of the channel. To see these contributions more clearly Eq. 6, as used by some embodiments of alternative Manakov solver 240', can be put into the following form $$\frac{\partial |A_i\rangle}{\partial z} = l(\omega_i)|A_i\rangle - i\gamma_m P_i |A_i\rangle + \qquad (\text{Eq. 7})$$
$$\frac{3i\gamma_m}{2} \sum_{j \neq i} P_T |A_i\rangle + \frac{i\gamma_m}{2} \hat{s}_i \cdot \vec{P}_T |A_i\rangle + \frac{\gamma_m}{2} (\hat{s}_i \times \vec{P}_T) \cdot \vec{\sigma} |A_i\rangle$$

where $P_T = \Sigma_i P_i$ is the total power in all the WDM channels, $\vec{P}_T = \Sigma i P_i$ is the sum of the Stokes vectors of all the channels (e.g., the collective vector), and $\hat{S}_i$ is the unit Stokes vector of the ith channel.

As it can be seen in Eq. 7 (used by some embodiments of alternative Manakov solver 240'), the polarization dependent term is split into two parts. The first part contributes only to the nonlinear phase shift. This term changes between the extremum $\pm \gamma_m P_T/2$ depending on the relative orientation of the channel with respect to the collective vector at a give point in time. The second term on the other hand causes nonlinear rotation of the ith channel around the collective vector at a rate proportional to the part of the collective vector that is orthogonal to the ith channel. Note that the cross product is at maximum when the Stokes vectors are orthogonal which occurs when the ith channel and the collective vector are at 45° in Jones space. Note that the polarization independent part of XPM is proportional to the sum of the powers of all the channels, but the polarization dependent part is proportional to the sum of the Stokes vectors of all the channels. In the extreme case when all the channels have the same SOP, the two parts of XPM are similar in magnitude. However, in a polarization multiplexed WDM system with large number of channels, polarization dependent portion of the term is expected to be smaller than the polarization independent portion.

As long as the signal at the receiver is obtained with adequate accuracy, the signal at the transmitter can be obtained by numerically solving either the full Manakov equation (Manakov solver module 240) or the coupled equations (coupled Manakov solver embodiment 240'). These equations can be solved in the backward direction and the received signal is used as the initial condition. As noted above, a known numerical method for solving the nonlinear propagation equations is the split-step Fourier method (SSFM), in which the fiber is divided into steps. As an approximation in each step only the nonlinear part or the dispersive part of the equations are solved. The step size is selected to be small enough to follow changes in the propagating field that are caused by both dispersion and nonlinearity. The step size is selected to be small enough so that the changes in the spectrum caused by the fiber nonlinearity could be followed accurately and therefore in the next step the dispersive propagation can be calculated accurately. The step size required by the fiber nonlinearity should be much smaller than the nonlinear length defined as $L_{NL} = (\gamma P)$ where P is the total power. Step size is selected to be small enough to follow how the optical field evolves along the fiber as a result of dispersion, so that the impact of nonlinear interactions can be followed accurately in the next step.

Calculating the dispersive and nonlinear evolution over and over in small steps along the fiber increases the computational load. To avoid unnecessarily increasing the computational load, some embodiments of Manakov solver module 240 and/or coupled Manakov solver embodiment 240' use small steps only for those changes in the optical field that are relevant to accurate calculation of nonlinear processes. As one example, in a transmission system where FWM is strong, step size is selected to be small enough to follow how the phases of the interacting fields change relative to one another because FWM is sensitive to such changes. However, if FWM is negligible, and XPM is the dominant source of nonlinear distortions, following the changes in the phases of the channels in small steps is unnecessary, since XPM is insensitive to relative phases of the channels. In this case, there are still constraints on step size, because XPM is sensitive to the walk-off between channels as a result of the group delay. However, the step size can be much larger as compared to what is optimal for the FWM process.

The FWM length can be defined as $L_{FWM}=4(\beta_2 N^2 \Delta\omega^2)^{-1}$ and the XPM length as $L_{XPM}=(\beta_2 N\Delta\omega B)^{-1}$, where N is the total number of WDM channels and B is the baud rate. $L_{FWM}$ is the length scales at which the relative phases of the farthest channels interacting through FWM changes by 1 radian. $L_{XPM}$ is the length at which the farthest WDM channels walk-off by one another by a bit period. These length scales should not be understood as the length scales at which FWM or XPM becomes important. Rather, these length scales should be understood as those that limit the maximum step size that can be used in the SSFM, which is imposed by the fiber dispersion in order to calculate FWM or XPM accurately.

In comparing the step size requirement imposed by FWM and XPM, it can be seen that for a transmission system where the impact of FWM is small, computational load can be decreased by a factor roughly given by the ratio of the FWM and XPM lengths: $L_{FWM}/L_{XPM}=N\Delta\omega/B$. Note that if the FWM is weak and therefore the step size is chosen to accommodate the XPM length, the FWM terms can be removed from the calculation in order to correctly calculate the impact of FWM terms. During the backward propagation process, the contribution of FWM can be miscalculated and it may grow strong even though FWM is weak in the forward propagation. When using the coupled equations of coupled Manakov solver embodiment 240', FWM terms appear explicitly and so can be removed from the equation. In contrast, when full Manakov equation of Manakov solver module 240 is used, the step-size is selected to be small enough to accurately calculate FWM, even though FWM is very weak and negligible.

The coupled equations of coupled Manakov solver embodiment 240' can use a lower sampling rate as compared to Manakov solver module 240, since solving the full Manakov equation accurately requires the sampling rate to cover twice the total bandwidth of the WDM system. This is true even though no significant energy is present outside of the WDM bandwidth. Therefore the number of samples per symbol when Manakov solver module 240 is used becomes $S_M=2N\Delta\omega/(2\pi B)$, because FWM can couple WDM channels to parts of the spectrum outside of the WDM bandwidth. If the sampling rate used with Manakov solver module 240 is not large enough, FWM causes aliasing which leads to errors.

In contrast, coupled equations of coupled Manakov solver embodiment 240' use only correct sampling of individual channels, which is 2 samples per channel per symbol. Therefore samples per symbol becomes $S_{CE}=2N$. As a result, coupled equations of coupled Manakov solver embodiment 240' always require lower numbers of samples as compared to full Manakov equations, as long as channel spacing is larger than the symbol rate.

When the effect of FWM is small and it is negligible, coupled equations have another significant advantage from a practical point of view. Because FWM is sensitive to the relative phases of the WDM channels, the phases of the WDM channels must be accurately measured at the receiver in order to accurately calculate contribution of FWM during back propagation. To make sure that the relative phases of the WDM channels are measured correctly, the local oscillators used at the coherent receivers for each WDM channel are locked in phase. Alternatively if the nonlinear compensation is implemented at the transmitter using digital backward propagation, the carriers of different WDM channels are locked in phase. Satisfying these conditions can be difficult as the number of the channels is increased. If the impact of FWM is negligible, however, neither the local oscillators nor the carriers need to be locked in phase, since XPM do not depend on the phases of the channels.

Figure 5:
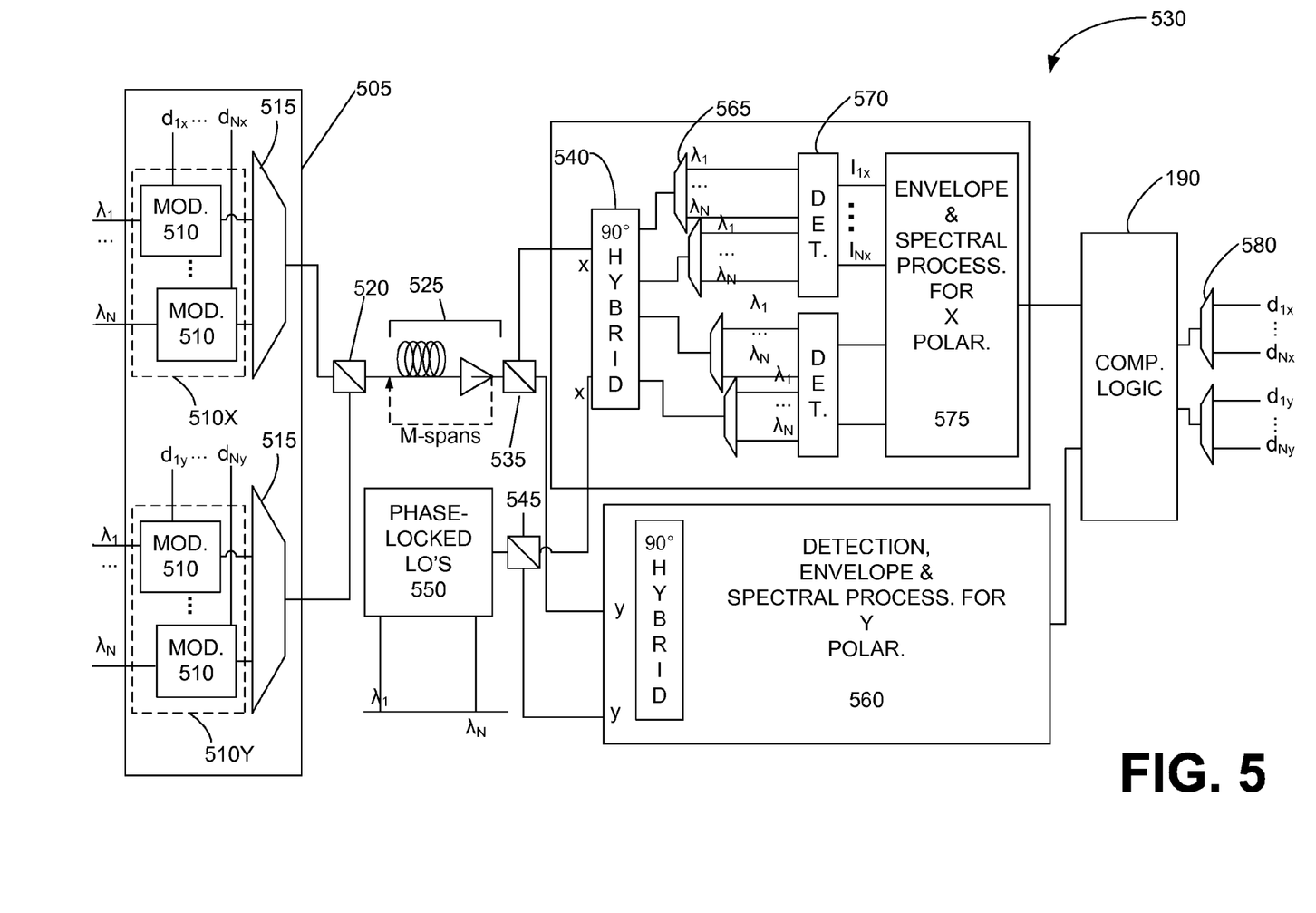
FIG. 5 is a block diagram of a wavelength division multiplexing (WDM) communication system utilizing polarization-dependent nonlinearity impairment compensation logic, according to some embodiments.

FIG. 5 is a block diagram of a wavelength division multiplexing (WDM) communication system utilizing an embodiment of polarization-dependent nonlinearity impairment compensation logic 190. Post-compensation is performed in the digital domain after coherent detection. Transmitter 505 includes a plurality of optical modulators 510. The modulators 510 in one set 510X modulates optical signals according to a subset of (electrical) data signals $d_{1X}$ to $d_{NX}$, and are thus associated with a particular polarization component, here X. Modulators in another set 510Y modulate according to another subset of data signals $d_{1Y}$ to $d_{NY}$, and are thus associated with a different polarization component, here Y. Each modulator 510 in a set 510X, 510Y modulates a corresponding optical signal at a frequency $(\lambda_1 \ldots \lambda_N)$. In the example embodiment of FIG. 5, the two sets of modulators 510X, 510Y share the same frequencies. Some embodiments use quadrature amplitude modulation (QAM), but the impairment compensation techniques disclosed herein are also suitable for other modulation schemes.

The wavelengths produced by each modulator set 510X, 510Y are combined by a corresponding multiplexer 515X, 515Y. That is, each multiplexer 515 performs wavelength-division multiplexing on the corresponding set of modulated optical signals. A polarization controller 520 combines the polarization channels and adjusts the state of polarization of each channel.

The wavelength-division and polarization-division multiplexed signal is transmitted over M (amplified) optical fiber spans 525. It should be appreciated that various technologies and mechanisms can be used for amplification and modulation. After transmission over M spans 525, the distorted signal is received at a receiver 530.

At receiver 530, another polarization splitter 535 separates the received distorted signal into polarization components and uses 90° optical hybrids 540 to mix each polarization component with a set of phase-locked local oscillators 550. Each hybrid 540 is supplied with an oscillator signal having the same polarization, produced by another polarization splitter 545 at the local oscillator output. The polarization component signals $E_x$ and $E_x$ are then processed separately. For simplicity, FIG. 5 only includes details of $E_x$ processing, with processing of $E_y$ represented by a single block 560.

After demultiplexing of the polarization-specific signal at blocks 565, a set of balanced photo-detectors 570 obtains in-phase and quadrature components of each WDM channel. The I and Q components of the polarization-specific signal are provided to a signal processing block 575. Signal processing block 575 produces a complex envelope, and sums the per-frequency signals into a single, polarization-specific input to polarization-dependent nonlinearity impairment compensation logic 190. Signal processing block 575 will be described in more detail in connection with FIG. 6.

Polarization-dependent nonlinearity impairment compensation logic 190 solves the vectorial NLSE, using the techniques described above, to model for compensation of various impairments including non-linear impairments with their polarization dependence. Finally, the polarization-specific component of each compensated signal is demultiplexed (580), and the originally transmitted data is estimated. Data recovery is then complete.

Figure 6:
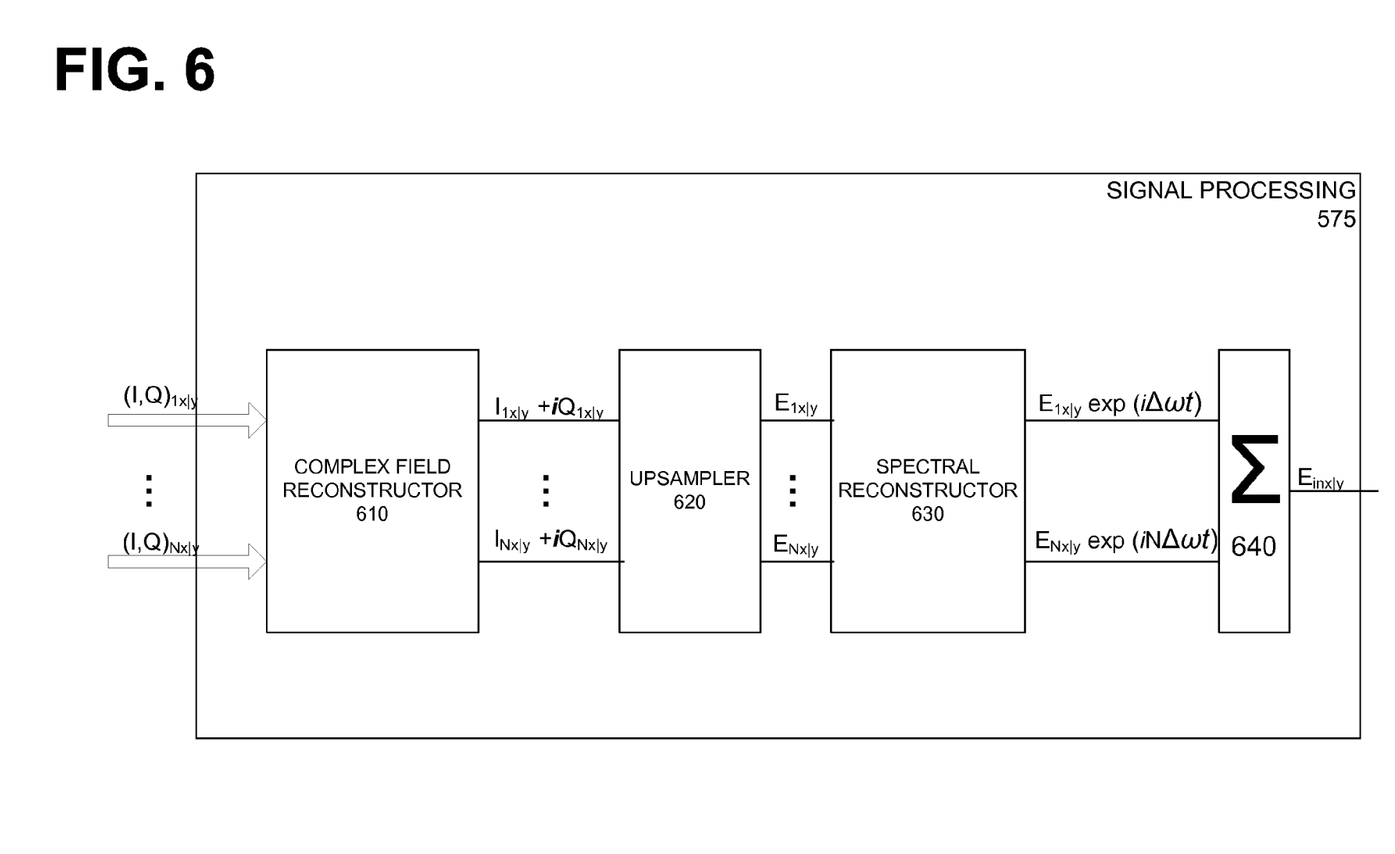
FIG. 6 is a block diagram of a signal processing block from FIG. 5, according to some embodiments.

FIG. 6 is a block diagram showing further details of signal processing block 575. Inputs into signal processing block 575 are I and Q components for 1 . . . N frequencies, for a particular polarization, either x or y. (As shown in FIG. 5, another instance of signal processing block 575 handles the other polarization component). A complex field reconstructor 610 produces the complex form of the signal for each channel, $\hat{E}_{1x|y} \ldots \hat{E}_{Nx|y}$ ($E_{jx|y}=I_{jx|y}+iQ_{jx|y}$). An upsampler 620 performs upsampling to generate $E_{1x|y} \ldots E_{Nx|y}$, then a spectral reconstructor 630 produces the signals $\tilde{E}_{1x|y} \ldots \tilde{E}_{Nx|y}$ ($\tilde{E}_j = \exp(ij\Delta\omega t)$), which are supplied to summation block 640. Summation block 640 combines the per-channel signals $\tilde{E}_{1x|y} \ldots \tilde{E}_{Nx|y}$, into a single $E_{inx|y}$, which is output from signal processing block 575 and provided to polarization-dependent nonlinearity impairment compensation logic 190.

Figure 7:
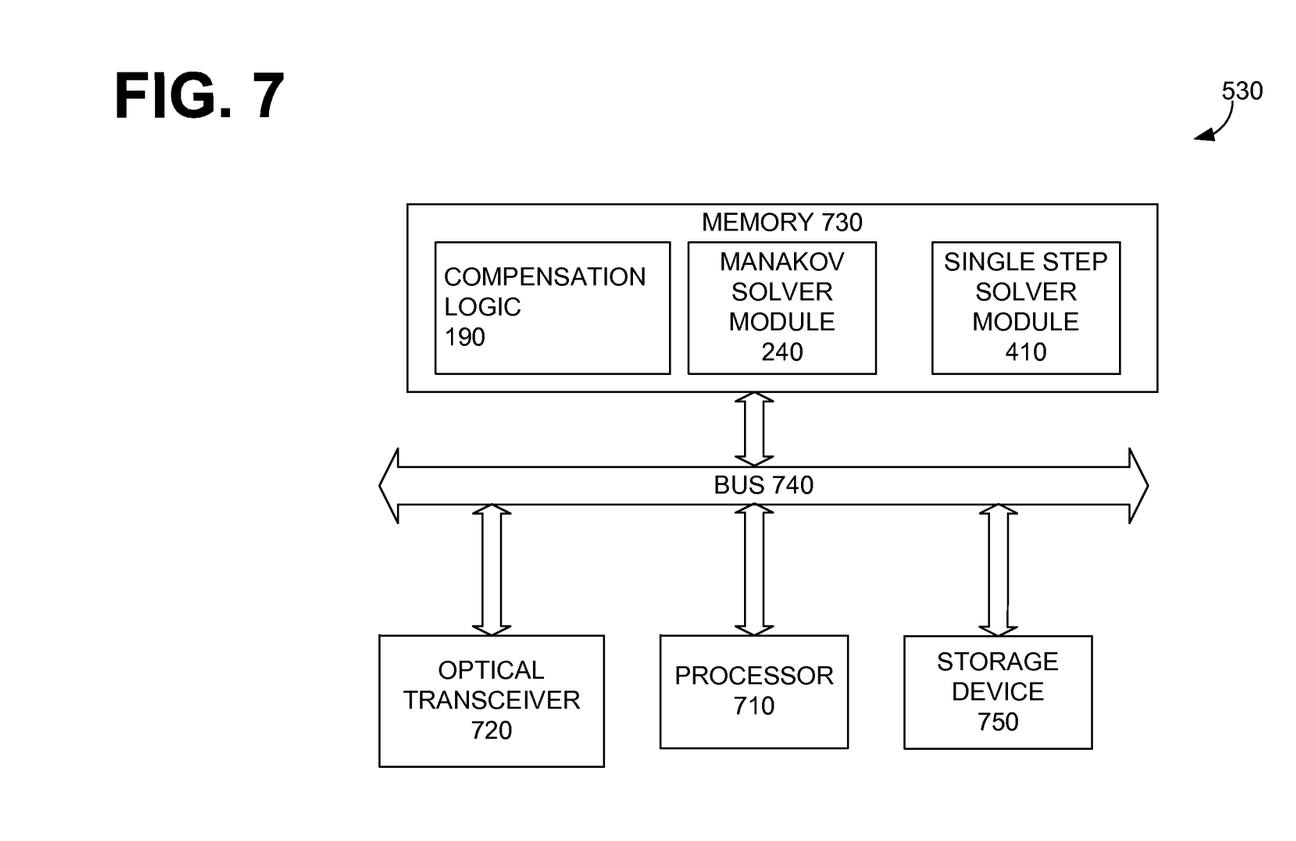
FIG. 7 is a block diagram of a receiver from FIG. 5, according to some embodiments.

FIG. 7 is a block diagram of receiver 530 according to some embodiments disclosed herein. Receiver 530 contains a number of components that are well known in the computer arts, including a processor 710 (e.g., microprocessor, digital signal processor, microcontroller, digital signal controller), an optical transceiver 720, and memory 730. These components are coupled via a bus 740. Some embodiments also include a storage device 750, such as non-volatile memory or a disk drive. Omitted from FIG. 7 are a number of conventional components that are unnecessary to explain the operation of receiver 530.

Polarization-dependent nonlinearity impairment compensation logic 190, Manakov solver module 240, coupled Manakov solver embodiment 240', and single-step solver module 400 can be implemented in software (i.e., instructions executing on a processor), in hardware (i.e., specialized logic), or combinations thereof. In the embodiment of FIG. 7, polarization-dependent nonlinearity impairment compensation logic 190, Manakov solver module 240, coupled Manakov solver embodiment 240', and single-step solver module 400 are software. That is, these components reside in memory 730 as instructions which, when executed by processor 710, implement the systems and methods of fiber impairment compensation disclosed herein. In other embodiments (not shown), polarization-dependent nonlinearity impairment compensation logic 190, Manakov solver module 240, and single-step solver module 400 are in digital logic, including, but not limited to, a programmable logic device (PLD), a programmable gate array (PGA), a field programmable gate array (FPGA), an application-specific integrated circuit (ASIC), a system on chip (SoC), and a system in package (SiP). Such digital logic implementations are not limited to pure digital but may also include analog sections or components.

Polarization-dependent nonlinearity impairment compensation logic 190, Manakov solver module 240, Manakov solver module 240, and single-step solver module 400, or combinations thereof, can be embodied in any computer-readable medium for use by or in connection with a processor. In the context of this disclosure, a "computer-readable medium" can be any means that can contain or store the instructions for use by the processor. The computer readable medium can be, for example but not limited to, a system or that is based on electronic, magnetic, optical, electromagnetic, or semiconductor technology. Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of compensating for transmission impairment, the method comprising:
  receiving a polarization-division multiplexed optical signal which has been distorted in the physical domain by an optical transmission channel that includes an optical fiber and an optical amplifier;
  converting the distorted polarization-division multiplexed optical signal into an electronic domain; and
  processing the distorted polarization-division multiplexed optical signal, in the electronic domain, by modeling a virtual optical fiber, corresponding to the optical fiber, in a virtual optical transmission channel, corresponding to the optical transmission channel, according to a Manakov equation, the modeling using dispersion, loss and nonlinearity parameters, opposite in value to corresponding parameters of the optical fiber, to account for dispersion, intra-channel, and at least some inter-channel impairments.

2. The method of claim 1, wherein the virtual optical transmission channel includes a virtual attenuator, the method further comprising:
  modeling the virtual attenuator with an attenuation parameter that balances a gain of the corresponding optical amplifier.

3. The method of claim 1, wherein the Manakov equation is a full Manakov equation.

4. The method of claim 1, wherein the Manakov equation is a set of coupled Manakov equations.

5. The method of claim 1, further comprising:
  solving the Manakov equation using a split-step Fourier method.

6. The method of claim 1, further comprising:
  solving the Manakov equation using a split-step infinite impulse response method.

7. A receiver comprising:
  memory containing instructions stored thereon;

a processor configured by the instructions;

an optical detector configured to receive a polarization-multiplexed optical signal which has been distorted in the physical domain by an optical transmission channel and further configured to provide a corresponding distorted polarization-multiplexed electrical signal to the processor, wherein the processor is configured by the instructions to:

process the distorted polarization-multiplexed electrical signal, in the electronic domain, by modeling a virtual optical fiber, corresponding to the optical fiber, in a virtual optical transmission channel, corresponding to the optical transmission channel, according to a Manakov equation, the modeling using dispersion, loss and nonlinearity parameters, opposite in value to corresponding parameters of the optical fiber, to account for dispersion, intra-channel, and at least some inter-channel impairments.

8. The receiver of claim 7, wherein the Manakov equation is a full Manakov equation.

9. The receiver of claim 7, wherein the Manakov equation is a set of coupled Manakov equations.

10. The receiver of claim 7, wherein the processor is further configured to:

model the virtual attenuator with an attenuation parameter that balances a gain of the corresponding optical amplifier.

11. The receiver of claim 7, wherein the processor is further configured to:

solve the Manakov equation using a split-step method.

12. The receiver of claim 7, wherein the processor is further configured to:

solve the Manakov equation using a split-step infinite impulse response method.

\* \* \* \* \*